US012135269B2

(12) United States Patent
Brosius et al.

(10) Patent No.: US 12,135,269 B2
(45) Date of Patent: Nov. 5, 2024

(54) SYSTEM AND METHOD FOR MEASURING SURFACE TENSION OF A LEVITATED SAMPLE

(71) Applicants: University of Florida Research Foundation, Inc., Gainesville, FL (US); United States of America As Represented By The Administrator of NASA, Washington, DC (US)

(72) Inventors: Nevin B. Brosius, Gainesville, FL (US); Ranganathan Narayanan, Gainesville, FL (US); Michael P. SanSoucie, Huntsville, AL (US)

(73) Assignees: UNIVERSITY OF FLORIDA RESEARCH FOUNDATION, INCORPORATED, Gainesville, FL (US); UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 424 days.

(21) Appl. No.: 17/505,224

(22) Filed: Oct. 19, 2021

(65) Prior Publication Data
US 2022/0120653 A1 Apr. 21, 2022

Related U.S. Application Data

(60) Provisional application No. 63/093,391, filed on Oct. 19, 2020.

(51) Int. Cl.
*G01N 13/02* (2006.01)
*G06T 7/62* (2017.01)

(52) U.S. Cl.
CPC .............. *G01N 13/02* (2013.01); *G06T 7/62* (2017.01); *G01N 2013/0225* (2013.01); *G01N 2013/0283* (2013.01)

(58) Field of Classification Search
CPC .......... G01N 13/02; G01N 2013/0225; G01N 2013/0283; G06T 7/62
(Continued)

(56) References Cited

U.S. PATENT DOCUMENTS 4,391,129 A * 7/1983 Trinh .................... G01N 29/036
73/64.48
5,150,272 A * 9/1992 Danley ..................... B01L 7/00
307/104
(Continued)

FOREIGN PATENT DOCUMENTS

CN 106092833 A * 11/2016
CN 110823769 A * 2/2020 ............. G01N 13/02
(Continued)

OTHER PUBLICATIONS

Mohit Singh, Neha Gawande, Rochish Thaokar; Influence of the trap potential waveform on surface oscillation and breakup of a levitated charged drop. J. Appl. Phys. Oct. 14, 2020; 128 (14): 145304. https://doi.org/10.1063/5.0020166 (Year: 2020).*
(Continued)

*Primary Examiner* — Octavia Hollington
*Assistant Examiner* — Monica S Young
(74) *Attorney, Agent, or Firm* — Thomas | Horstemeyer, LLP

(57) ABSTRACT

Various examples are provided related to measuring surface tension. In one example, a method includes levitating a sample using electrostatic levitation; applying a signal to at least one electrode to excite the sample into a n=3 mode of oscillation; capturing images of the sample with a respective image being associated with a particular frequency that is applied to the sample when the respective image is captured; quantifying sample resonance using a projection method of Legendre polynomials based on the plurality of images; and
(Continued)

determining a measured resonance frequency of the sample by an analysis of the sample resonance. The sample can be levitated using a feedback-controlled voltage and the applied signal can be swept over a range of frequencies. A system including electrodes, a position sensor, a camera device, and at least one computing device can be used to carry out the method.

18 Claims, 7 Drawing Sheets

(58) Field of Classification Search
USPC .................................................. 73/64.48
See application file for complete search history.

(56) References Cited

U.S. PATENT DOCUMENTS

| | | | | |
|---|---|---|---|---|
| 7,716,965 B2* | 5/2010 | Thundat | ............... | G01N 29/036 |
| | | | | 205/789.5 |
| 2005/0024808 A1* | 2/2005 | Kawasaki | ................. | H05B 6/32 |
| | | | | 361/234 |
| 2006/0192154 A1* | 8/2006 | Algots | ................... | H05G 2/003 |
| | | | | 250/504 R |
| 2018/0231447 A1* | 8/2018 | Narayanan | ............. | G01N 13/02 |

FOREIGN PATENT DOCUMENTS

| | | | | | |
|---|---|---|---|---|---|
| DE | 4004328 A1 | * | 5/1991 | | |
| DE | 69912403 T2 | * | 4/2004 | | |
| DE | 10346781 A1 | * | 5/2005 | ............. | G01N 13/02 |
| EP | 1434021 A1 | * | 6/2004 | ............. | F27B 17/00 |
| JP | 2010271234 A | * | 12/2010 | | |
| JP | 2012126196 A | * | 7/2012 | | |
| WO | WO-2004083757 A1 | * | 9/2004 | ............. | F27B 14/04 |

OTHER PUBLICATIONS

Brosius, N., Ward, et al. Faraday forcing of high-temperature levitated liquid metal drops for the measurement of surface tension. npj Microgravity 4, 10 (2018). https://doi.org/10.1038/s41526-018-0044-1: (Year: 2018).*

Luo, Y., Damaschke, B., Lohöfer, G. et al. Thermophysical properties of a Si50Ge50 melt measured on board the International Space Station. npj Microgravity 6, 10 (2020). https://doi.org/10.1038/s41526-020-0100-5 (Year: 2020).*

Paradis, et al. Non-contact measurements of the surface tension and viscosity of molybdenum using an electrostatic levitation furnace, International Journal of Refractory Metals and Hard Materials, vol. 25, Issue 1,2007, pp. 95-100, ISSN 0263-4368, https://doi.org/10.1016/j.ijrmhm.2006.02.001 (Year: 2006).*

Brosius, N., Ward, K., Wilson, E. et al. Benchmarking surface tension measurement method using two oscillation modes in levitated liquid metals. npj Microgravity 7, 10 (2021). https://doi.org/10.1038/s41526-021-00137-9 (Year: 2021).*

* cited by examiner

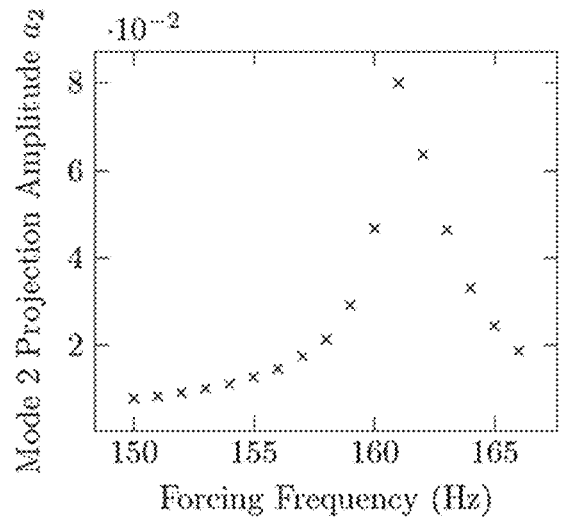
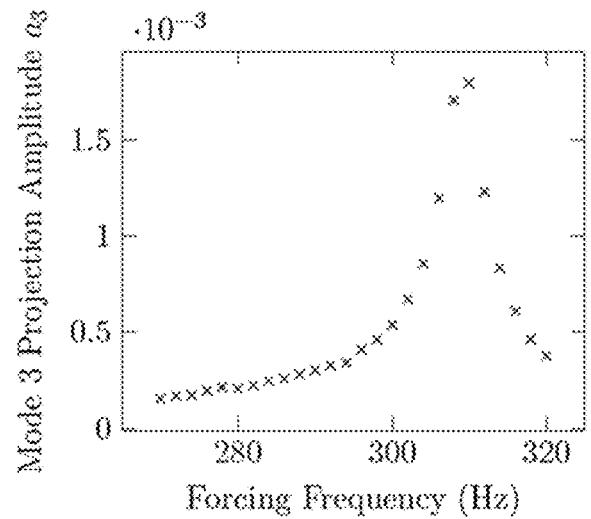
FIG. 5A
FIG. 5B
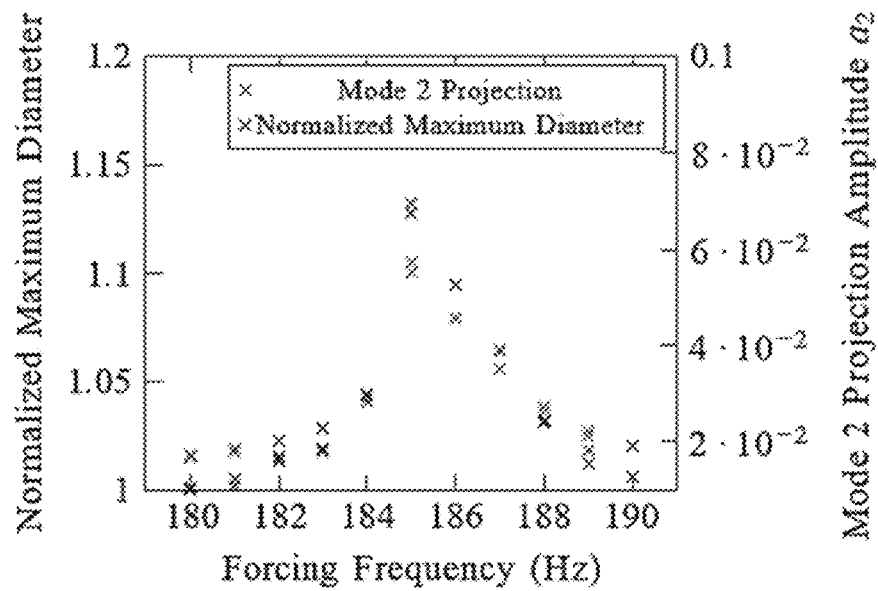
FIG. 6

SYSTEM AND METHOD FOR MEASURING SURFACE TENSION OF A LEVITATED SAMPLE

CROSS REFERENCE TO RELATED APPLICATIONS

This application claims priority to, and the benefit of, U.S. provisional application entitled "System and Method for Measuring Surface Tension" having Ser. No. 63/093,391, filed Oct. 19, 2020, which is hereby incorporated by reference in its entirety.

STATEMENT REGARDING FEDERALLY SPONSORED RESEARCH OR DEVELOPMENT

This invention was made with government support under Grant Nos. NNX17AL27G and 80NSSC18K1173 awarded by the National Aeronautics and Space Administration. The government has certain rights in the invention.

BACKGROUND

The accurate measurement of thermophysical properties is imperative for the future of countless areas of manufacturing [1] and extends its importance into space exploration with the recent push for the Lunar Gateway, in-space manufacturing, and in-situ resource utilization [2]. The reliability of processes like crystal growth, additive manufacturing, and welding depend on precise knowledge of thermophysical phenomena [3, 4]. However, thermophysical property measurement of high-temperature materials like liquid metals, glasses, and oxides is difficult using conventional means because of high surface reactivity [5]. The advent of containerless materials processing using aerodynamic [6], acoustic [7, 8], electromagnetic [9], and electrostatic [10] levitation technologies have provided an avenue for further improvements in the accuracy of thermophysical property measurements and can also be used to provide insights into other important material behavior like phase equilibria and solidification dynamics [9, 10]. Surface tension, a notably important property, can be measured using levitation technologies by exploiting the natural frequency $f_n$ at which a spherical liquid droplet comes to rest, given by [11]

$$f_n = \sqrt{\frac{n(n-1)(n+2)\gamma}{3\pi M}} \quad (1)$$

where $\gamma$ is the surface tension, n is the normal mode of oscillation and M is the mass. By experimentally finding the natural frequency $f_n$, one can solve Equation 1 for surface tension. Electrostatic levitation holds several advantages to other levitation techniques.

Aerodynamic and acoustic levitation both require the presence of a fluid medium, which can present engineering challenges like contamination, viscous effects [5], and large deviations in the spherical base state [12]. Electromagnetic levitation experiments take place in vacuum but also suffer from the issue of asphericity [13]. The non-spherical nature of the droplet causes its frequency response to split degenerate n=2 modes into separate frequencies. However, in electrostatic levitation, experimental observations [5] have found that the droplet is significantly more spherical than other levitation techniques, often resulting in single frequency response. Faraday forcing uses electrostatic levitation as a means to measure surface tension.

The Faraday forcing method in levitated liquid droplets has recently been introduced as a method for measuring surface tension using resonance. By subjecting an electrostatically-levitated liquid metal droplet to a continuous, oscillatory, electric field, at a frequency nearing that of the droplet's first principal mode of oscillation (known as mode 2), the method was previously shown to determine surface tension of materials that would be particularly difficult to process by other means, e.g. liquid metals and alloys. It also offered distinct advantages over the conventional levitation-based method of pulse-decay, particularly for high viscosity samples, avoiding undesirable control system perturbations to the sample upon pulse-release.

BRIEF DESCRIPTION OF THE DRAWINGS

Many aspects of the present disclosure are better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIGS. 5A-5B show results from the benchmarking of the Faraday forcing method: (FIG. 5A) a mode 2 sweep and (FIG. 5B) a mode 3 sweep, in accordance with various aspects of the present disclosure. Sample is 57.345 mg Inconel 625 at 1350° C.

FIG. 6 shows comparison of projection and normalized diameter results for the Faraday forcing method on mode 2 resonance, in accordance with various aspects of the present disclosure. Sample is 35.027 mg Zirconium at 1800° C.

DETAILED DESCRIPTION

Figure 1:
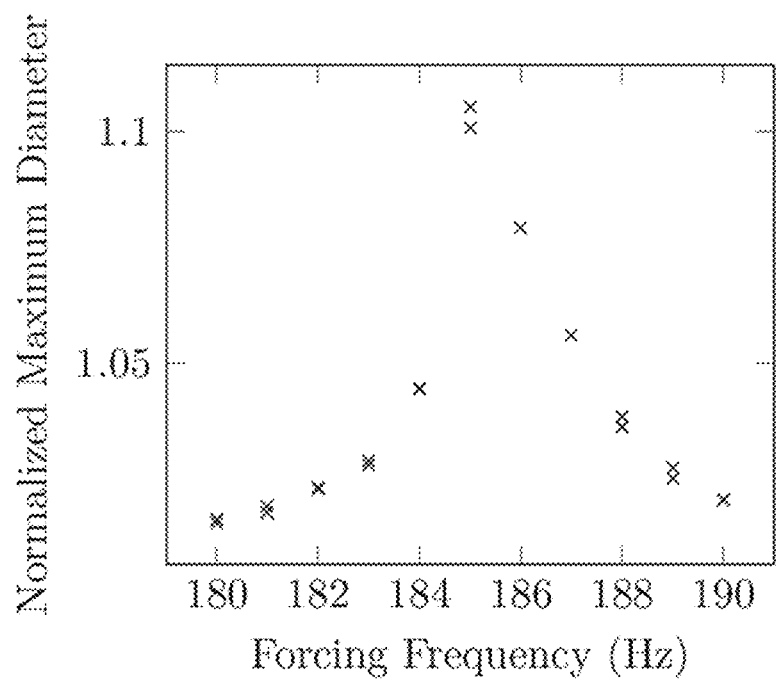
FIG. 1 shows the Faraday forcing method using the normalized maximum diameter of the oscillating sample (from Brosius et al [14]), in accordance with various aspects of the present disclosure. Sample is 35.027 mg Zirconium at 1800° C.

Many modifications and other embodiments disclosed herein will come to mind to one skilled in the art to which the disclosed systems and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise.

The term "interfacial tension" and "surface tension" are used interchangeably herein, which refer to the tension between the sample and phase surrounding the sample. For example, the sample can be in a liquid state, and its surroundings can be in a gaseous state, such as air or another gas. The sample can include liquid metals, semiconductors, liquid ceramics, liquefied glass, common liquids, and other materials.

The present disclosure generally relates to systems and methods for the measurement of interfacial tension (IFT) through the use of continuously forced electrostatically levitated droplets. Some methods involve drop tension meters, spinning drop tensiometers, Wilhelmy plate tension meters, and interfacial tension measurement through pulse-decay analysis of electrostatically levitated drops. These methods have various drawbacks. One drawback to the pulse-decay analysis is a difficulty in the analysis of the resulting decaying oscillations, for example, if the viscosity of the material in question is high. By contrast, the present disclosure can overcome this issue and can be used in extreme environments, such as high temperature or low interfacial tension, with accuracy. IFT measurement using continuously forced electrostatically levitated droplets can be used with high viscosity samples with no difficulties.

Generally, the systems and methods involve the electrostatic levitation of a droplet in the liquid state. The droplet can be spherical when levitated. The droplet can be levitated when already in the liquid state, or levitated as a solid sphere and then melted using a laser or furnace. The levitation is achieved through a feedback controlled voltage drop between two electrodes located on either pole of the droplet, creating a Coulomb Force on the droplet which acts counter to gravity. After successful levitation, the droplet is continuously perturbed or forced by applying an additional sinusoidal voltage on the top electrode with an input frequency and amplitude. The amplitude of oscillation is held constant, and the frequency is swept over a large range which includes the predicted frequency that resonates with the natural frequency of the material, given by the theory of Rayleigh. The predicted frequency can be predetermined and, for example, stored in a memory. The droplet is viewed with a high-speed camera and the shape of the droplet is recorded through the entire frequency sweep. For example, each image can have a timestamp. In addition, separate videos can be made for each forcing frequency, and these videos can be so labeled. Accordingly, a respective image can be associated with both the time and frequency, for example, using the image data that includes the frequency label for the video and the timestamp for the image. Alternatively, a single or continuous video can be made that includes multiple frequencies. Also, each frame or image can be directly associated with both a frequency label or frequency stamp and a timestamp. The camera can, in some examples be 500 fps or higher, 1000 fps or higher, 2500 fps or higher, or 5000 fps or higher. The camera can include any resolution, but can in some cases be 512×512 pixels or higher, 1024×1024 pixels or higher, or another resolution or another aspect ratio.

After recording, the images are analyzed to determine which forcing frequency resulted in the largest disturbance of the levitated droplet away from a spherical shape. The imposed oscillatory voltage will cause the droplet to undergo cycles of prolate and oblate ellipsoidal shapes, with the magnitude of the departure from a spherical shape increasing as the imposed frequency nears the natural frequency and resonates with it. This resonance frequency is taken to be the forcing frequency that causes the largest disturbance from spherical, and because it is equal to the natural frequency of the drop, it allows one to deduce the interfacial tension of the material, for example, using Rayleigh Theory. In one embodiment, the sample resonance/disturbance is quantified using a projection method of Legendre polynomials.

In some embodiments, a system includes a plurality of electrodes, a position sensor, a camera device, and at least one computing device that can be used to perform or execute instructions. A sample can be levitated using a feedback-controlled voltage applied to at least one of the plurality of electrodes. The feedback-controlled voltage can be determined based at least in part on a position of the sample that is detected by the position sensor. A heating laser can melt the sample into a liquid state once the sample is levitated. A signal can be applied to at least one of the plurality of electrodes. The signal can be a sinusoidal signal that comprises the fixed amplitude and is swept over the range of frequencies.

The signal can include a fixed amplitude. The fixed amplitude can be chosen as an amplitude that results in drop deviations from the spherical shape that are considerably smaller than the diameter of the drop. This signal can be swept over a range of frequencies that includes the natural frequency. The natural frequency is a formula that is related to the drop density, its, radius and its IFT. Therefore, it determines the forcing frequency, which when equal to it resonates with it. In other words, the forcing frequency becomes the resonant frequency when it equals the natural frequency. A plurality of images of the sample can be captured using the camera device. A respective image of the plurality of images can be associated with a particular frequency that is applied to the sample when the respective image is captured. The plurality of images can be analyzed to determine that the particular frequency is the measured resonance frequency of the sample, based at least in part on the respective image showing a maximum response deviation of the levitated sample from its spherical shape. In other words, a measured resonance frequency of the sample can be determined or identified using an analysis of the plurality of images that indicates that the respective image shows a maximum response deviation of the levitated sample from its spherical shape, wherein the measured resonance frequency is the particular frequency that is applied to the sample when the respective image, which shows the largest departure from the sample's spherical shape, is captured. In one embodiment, the sample resonance/disturbance is quantified using a projection method of Legendre polynomials The maximum response deviation can be identified based at least in part on the respective image including a maximum distance across the sample, among the plurality of images. In some cases, the maximum distance can be measured across a major axis of a prolate shape of the sample shown in the respective image. In other cases, the maximum distance is measured across an axis of an oblate shape of the sample shown in the respective image. An interfacial tension of the sample can also be determined using the measured resonance frequency.

In some embodiments, a method can be performed, which can be a computer-implemented method. The method can include levitating a sample using a feedback-controlled voltage applied to at least one of a plurality of electrodes. The feedback-controlled voltage can be determined based at least in part on a position of the sample that is detected by a position sensor. In some cases, the sample can be melted into a liquid state using a heating laser once the sample is levitated.

The method can also include applying a continuous signal to at least one of the plurality of electrodes. The signal can include a fixed amplitude and can be swept over a range of frequencies that includes a predetermined frequency. The signal can be a sinusoidal signal swept over a range of frequencies that includes a predetermined frequency. The predetermined frequency can be a predicted natural frequency determined using Rayleigh theory. The method can further include capturing a plurality of images of the sample using a camera device, a respective image of the plurality of images being associated with a particular frequency that is applied to the sample when the respective image is captured.

The method can further include identifying a measured resonance frequency of the sample by an analysis of the plurality of images that indicates that the respective image shows a maximum response deviation of the levitated sample from its spherical shape, wherein the measured resonance frequency is the particular frequency that is applied to the sample when the respective image is captured. The maximum response deviation can be identified based at least in part on the respective image including a maximum distance across the sample, among the plurality of images. In some cases, the maximum distance can be measured across a major axis of a prolate shape of the sample shown in the respective image. In other cases, the maximum distance can be measured across an axis of an oblate shape of the sample shown in the respective image. The method can also include determining an interfacial tension of the sample using the measured resonance frequency.

In one aspect, the present disclosure provides a method including the steps of levitating a sample using electrostatic levitation; applying a first signal to at least one electrode, wherein the first signal excites the sample into a n=3 mode of oscillation, the first signal is swept over a range of frequencies that includes a predetermined frequency; capturing a plurality of images of the sample using a camera device, a respective image of the plurality of images being associated with a particular frequency that is applied to the sample when the respective image is captured; and quantifying, using at least one computing device, a plurality of sample resonance using a projection method of Legendre polynomials based on the plurality of images, a respective sample resonance being associated with a respective image and a particular frequency that is applied to the sample when the respective image is captured; and determining a measured resonance frequency of the sample by an analysis of the plurality of sample resonance that indicates that the respective sample resonance shows a maximum response deviation of the levitated sample, wherein the measured resonance frequency is the particular frequency that is associated with the respective sample resonance.

In one embodiment, the method further includes determining a surface tension of the sample based on the measured resonance frequency of the sample at n=3 mode of oscillation.

In one embodiment, the method further includes the steps of applying a second signal to at least one electrode, wherein the second signal provides a constant force on the sample to excite the sample into a n=2 mode of oscillation, the second signal is swept over a range of frequencies that includes a predetermined frequency; determining a measured resonance frequency of the sample at n=2 mode of oscillation; and determining a surface tension of the sample at least partly based on the measured resonance frequency of the sample at n=2 mode of oscillation. In one embodiment, the surface tension is determined based on the average value of the surface tension from n=2 mode of oscillation and n=3 mode of oscillation.

In one embodiment, the method further includes the steps of applying a third signal to at least one electrode, wherein the third signal provides a constant force on the sample to excite the sample into a n=4 mode of oscillation, the third signal is swept over a range of frequencies that includes a predetermined frequency; determining a measured resonance frequency of the sample at n=4 mode of oscillation; and determining a surface tension of the sample at least in part based on the measured resonance frequency of the sample at n=4 mode of oscillation. In one embodiment, the surface tension is determined based on the average value of the surface tension from n=2 mode of oscillation, n=3 mode of oscillation, and n=4 mode of oscillation.

In one embodiment, the predetermined frequency is a predicted resonance frequency determined using a formula that relates frequency to spherical radius, density, and surface tension of the sample.

In one embodiment, the signal is a sinusoidal signal. In one embodiment, the method includes melting the sample into a liquid state using a heating laser once the sample is levitated.

In one aspect, the present disclosure provides a system including a plurality of electrodes; a position sensor; a camera device; and at least one computing device that executes instructions that cause the system to at least: levitate a sample using a feedback-controlled voltage applied to at least one of the plurality of electrodes, wherein the feedback-controlled voltage is determined based at least in part on a position of the sample that is detected by the position sensor; apply a signal to at least one of the plurality of electrodes, wherein the signal comprises a fixed amplitude exciting the sample into a n=3 mode of oscillation and is swept over a range of frequencies that includes a predetermined frequency; capture a plurality of images of the sample using the camera device, a respective image of the plurality of images being associated with a particular frequency that is applied to the sample when the respective image is captured; quantify a plurality of sample resonance using a projection method of Legendre polynomials based on the plurality of images, a respective sample resonance being associated with a respective image and a particular frequency that is applied to the sample when the respective image is captured; and determine a measured resonance frequency of the sample by an analysis of the plurality of sample resonance that indicates that the respective sample resonance shows a maximum response deviation of the levitated sample, wherein the measured resonance frequency is the particular frequency that is associated with the respective sample resonance.

In one embodiment, the computing device further executes instructions that cause the at least one computing device to determine a surface tension of the sample using the measured resonance frequency at n=3 mode of oscillation.

In one embodiment, the computing device further executes instructions that cause the at least one computing device to: apply a second signal to at least one electrode, wherein the second signal provides a constant force on the sample to excite the sample into a n=2 mode of oscillation, the second signal is swept over a range of frequencies that includes a predetermined frequency; determine a measured resonance frequency of the sample at n=2 mode of oscillation; and determine a surface tension of the sample at least partly based on the measured resonance frequency of the sample at n=2 mode of oscillation.

In one embodiment, the computing device further executes instructions that cause the at least one computing device to: apply a third signal to at least one electrode, wherein the third signal provides a constant force on the sample to excite the sample into a n=4 mode of oscillation, the third signal is swept over a range of frequencies that includes a predetermined frequency; determine a measured resonance frequency of the sample at n=4 mode of oscillation; and determine a surface tension of the sample at least in part based on the measured resonance frequency of the sample at n=4 mode of oscillation.

In one embodiment, the predetermined frequency is a predicted resonance frequency determined using a formula that relates frequency to spherical radius, density, and surface tension of the sample. In one embodiment, the signal is a sinusoidal signal. In one embodiment, the system further includes a heating laser that melts the sample into a liquid state using a heating laser once the sample is levitated.

Figure 11:
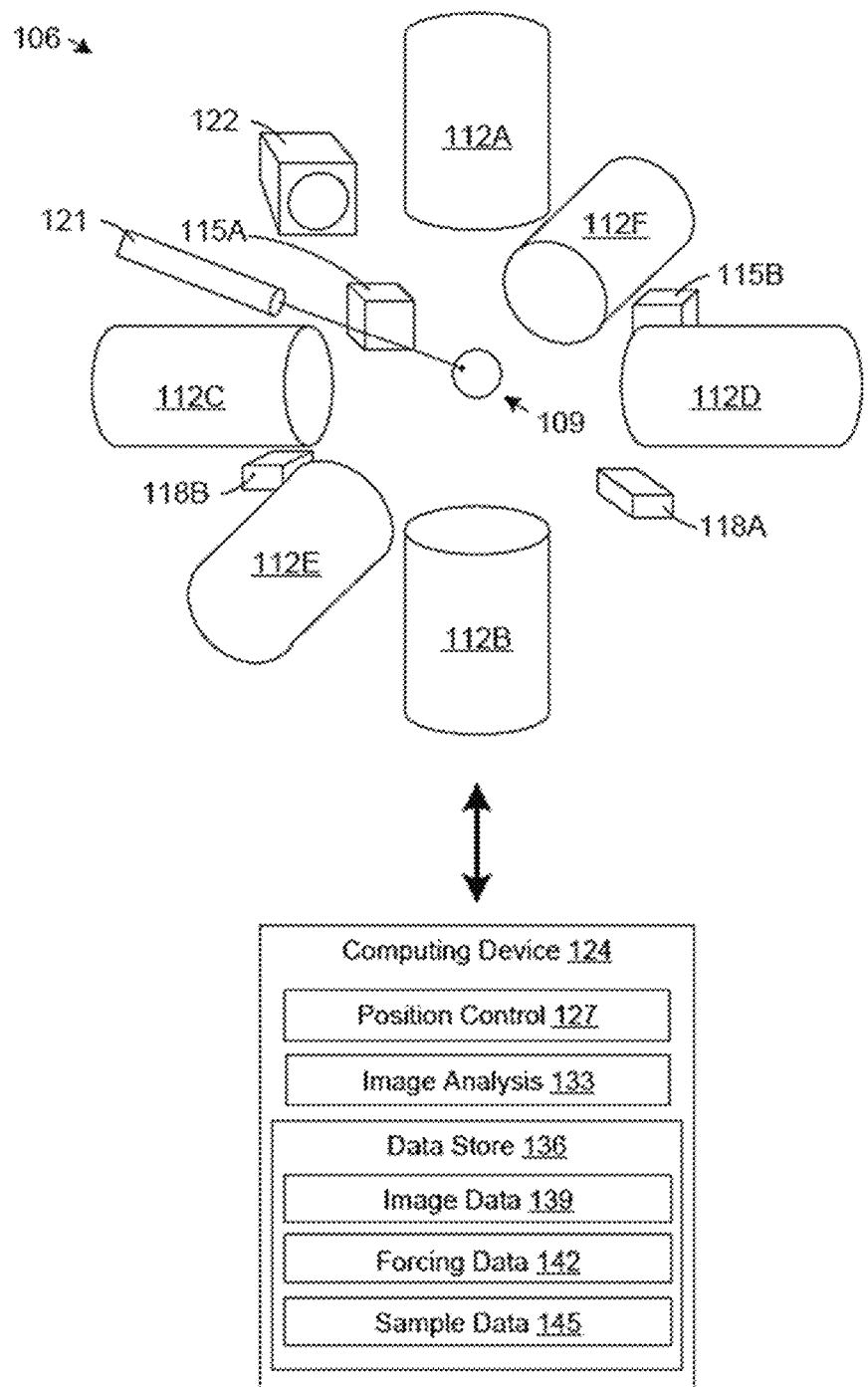
FIG. 11 is a drawing that illustrates an example system that measures interfacial tension by continuously pulsing an electrostatically levitated sample, in accordance with various aspects of the present disclosure.

FIG. 11 illustrates a system 106 that can be used for the measurement of Interfacial tension ("IFT") of the sample 109. The sample 109 can be suspended using electrostatic levitation. Electrostatic levitation of the sample 109 can be achieved using a number of electrodes 112, including the electrodes 112A, 112B, 112C, 112D, 112E, and 112F. The system can also include position sensor 115, including position sensors 115A and 115B, and in some cases the corresponding backlights 118A and 118B, which can in some case be laser-based backlights or other backlights designed for the sensors 115A and 115B. A laser 121 can be used to heat and melt the sample 109. A camera 122, such as a high speed camera, can be used to capture images of the sample 109 throughout the procedure. While excluded from the figure for clarity, an ultraviolet lamp can be used to impart a charge to the sample 109, and a temperature sensor such as a pyrometer, infrared thermometer, or the like can be used to detect a temperature of the sample 109. The temperature data from the temperature sensor can be used to control the laser 121 or other heating apparatus such as a furnace, to maintain the sample 109 at a target temperature. In some cases, the target temperature can be chosen to ensure the sample 109 is in a liquid state.

These devices can each be communicatively connected with a computing device 124, which can be representative of a single computing device 124 or multiple computing devices 124 to facilitate or perform the various actions described individually or in combination, for the measurement of IFT of the sample 109. The computing device 124 can in some cases execute instructions such as, position control functionality 127 and image analysis functionality 133, among other instructions. Each of these functionalities can be embodied in applications, programs, or other instructions, and can be executed by the computing device 124. In some examples these functionalities can be directed or performed by a user and can be facilitated by the computing device 124, and in other cases these functionalities can be automated or performed by the computing device 124.

A data store 136 communicatively connected with the computing device 124 can store the instructions, including the position control functionality 127 and the image analysis functionality 133, among other instructions. The data store 136 can further store image data 139, pulsing data 142, and sample data 145, and other data.

A voltage can be applied to at least one of the electrodes 112 to cause an electrostatic field that levitates the sample 109. For example, when the sample is levitated as shown in FIG. 1, a voltage can be applied to at least one of the electrodes 112A or 112B to maintain an electrostatic field that can levitate the sample 109. The voltage that is applied to the electrode 112A, 112B, or both the electrodes 112A and 112B, can cause a feedback controlled voltage drop across the electrodes 112A or 112B that can counteract gravity, thereby levitating the sample 109. Because these electrodes are located above and below the sample 109, the voltage drop can be used to counteract forces in the vertical direction such as gravity. The electrodes 112C, 112D, 112E, and 112F are situated lateral to sample 109, and can be used to move the sample 109 laterally, for example, to maintain its lateral position, by applying voltage to the respective electrodes.

The position sensor 115 can be utilized to detect the position of the sample 109, which can be continuously monitored in order to maintain a target position for the sample 109. The position sensor 115 can include multiple position sensors such as the position sensors 115A and 115B, such that the position of the sample 109 can be monitored and maintained in three dimensions. In some cases, position sensor 115A can include or be used in conjunction with the corresponding backlight 118A. Position sensor 115B can likewise include or be used in conjunction with the backlight 118B. The position control functionality 127 can receive position data from the position sensor 115, and can apply a feedback controlled voltage to any of the electrodes 112, or any subset of the electrodes 112 to levitate the sample 109.

While shown in one particular arrangement in the figure, the electrodes 112 can be positioned in other arrangements to maintain the that levitate the sample 109. For example, another arrangement could have eight electrodes, each positioned at the corners of an imaginary box shape, or other arrangements. Nevertheless, the position control functionality 127 can use position data from the position sensor 115 to apply a feedback controlled voltage to any one of the electrodes, or any subset of the electrodes in various arrangements, as required to levitate the sample 109 and maintain its position.

The laser 121 can be used to heat and melt the sample 109. The sample 109 can be levitated when already in the liquid state, or levitated as a solid sphere and then melted using the laser 121. While one laser 121 is shown, multiple such lasers 121 can be used to melt the sample 109 into a liquid state, and to maintain a target temperature, for example, using feedback data from a temperature sensor. In some cases, this can be performed through a temperature control functionality of the computing device 124, and stored in the data store 136. Alternatively, a furnace can be used for heating the sample 109 into a liquid state.

An additional signal can be applied to any one of the electrodes 112, or a subset of the electrodes 112 to pulse the sample. In other words, applying the signal can disrupt the levitated sample 109 and cause it to vibrate or oscillate. The vibration can deform the sample 109, disturbing it from a spherical shape into prolate and oblate shapes. When the sample 109 is vibrated at its resonance frequency, the sample 109 can reach a maximum disturbance from a spherical shape.

The range of frequencies can include a predicted resonance frequency of the sample 109. The predicted resonance frequency can, for example, be determined using the theory of Rayleigh or can be another established or expected value, which can be stored in the data store 136, for example, in the pulsing data 142. The pulsing data 142 can also include the range of frequencies to be swept, and the amplitude of the signal, and other signal data such as a rate of change of the frequency sweep, a total duration in time of the signal, and particular times that are associated with particular frequencies in the signal. Particular frequencies are not limited to whole-number frequencies and can indicate any level of specificity, including fractional or decimal values.

The camera 122 can capture images of the sample as the frequency is swept across the range of frequencies, and store them in the image data 139. Accordingly, each frame of a video feed, or each image that is captured, can be associated with the particular frequency that is applied to the sample 109 when the image or the frame is captured. In some cases, multiple images can be associated with a same particular frequency. A shape of the sample 109 can be analyzed in each image or frame. A particular one of the images of the image data 139 can show a maximum disturbance of the levitated sample 109, or a maximum deviation from a spherical shape. Once the image that shows the maximum disturbance of the sample 109 is identified through the analysis, the frequency of the sweep that was applied when the image was captured can be identified. This frequency can be considered a measured resonance frequency of the sample 109, and can be stored in the sample data 145.

The maximum disturbance can be determined in a number of ways. For example, each image can be angled, and a distance can be measured across a major axis of a prolate shape of the sample 109 shown in each image. A particular image can show a maximum distance across a major axis of a prolate shape. In other cases, the maximum distance can be measured across an axis of an oblate shape of the sample 109 shown in the respective image. Alternatively, an image can be identified that has a maximum or minimum vertical size of the sample 109, a maximum or minimum horizontal size of the sample 109, or another maximum or minimum measure of the sample 109 can be identified.

In another embodiment, sample resonance may be quantified using a projection method of Legendre polynomials based on the captured sample image. A measured resonance frequency of the sample 109 may be determined by an analysis of a plurality of quantified sample resonance that indicates that the respective quantified sample resonance shows a maximum response deviation of the levitated sample, wherein the measured resonance frequency is the particular frequency that is associated with the respective sample resonance.

The measured resonance frequency of the sample 109 is related to the interfacial tension of the sample 109. A calculation can be performed to determine the IFT of the sample 109 using the measured resonance frequency. The calculated IFT is based on the measured resonance frequency and can be considered a measured IFT. The measured IFT can be stored in the sample data 145.

Figure 12:
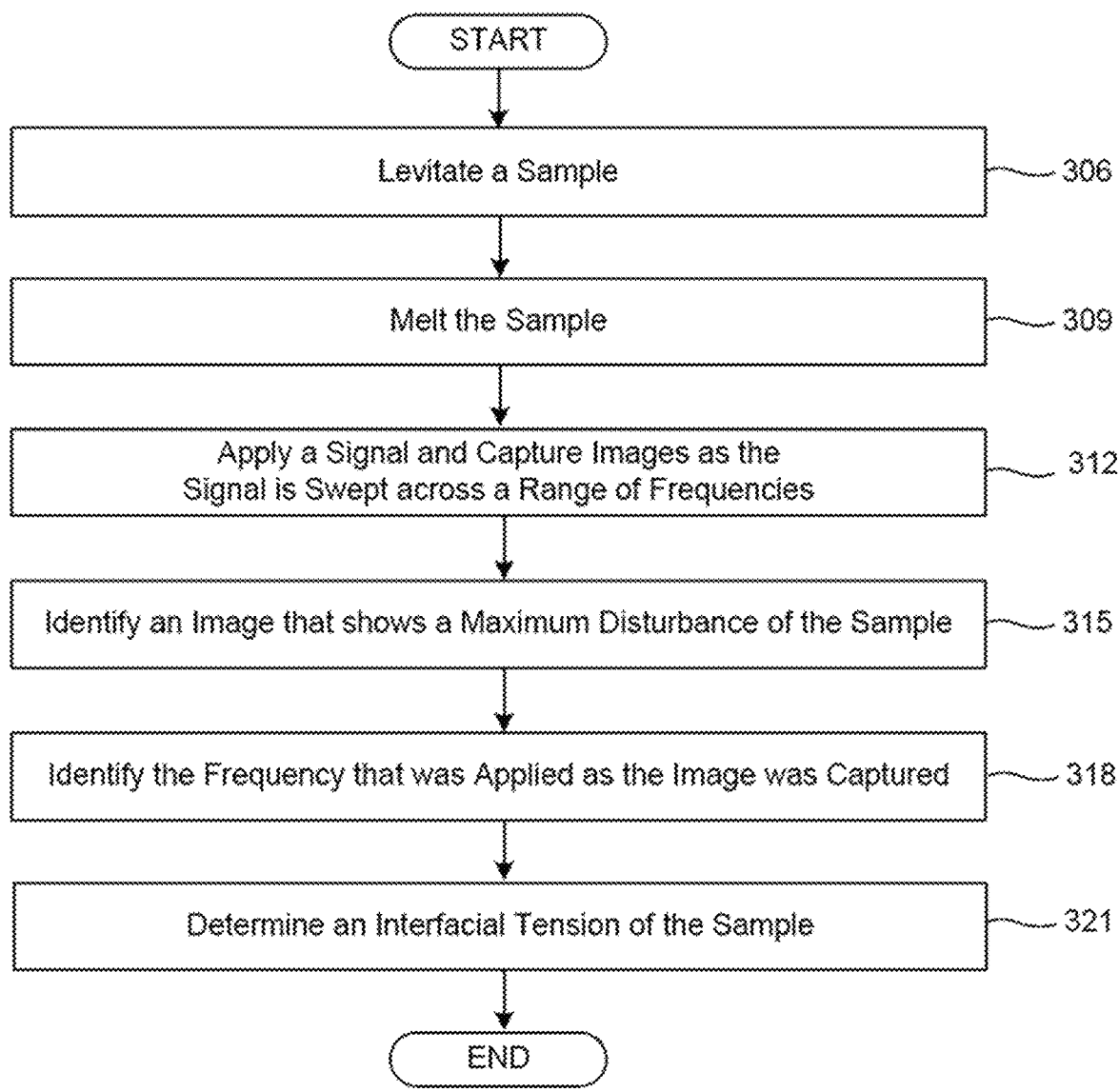
FIG. 12 is a flowchart that illustrates example actions to measure interfacial tension by continuously pulsing an electrostatically levitated sample, in accordance with various aspects of the present disclosure.

FIG. 12 shows an example flowchart of measurement of IFT of a sample 109 through the use of a signal applied to at least one of the electrodes 112. In some cases, the actions of the flowchart can be performed using the computing device 124, for example, through instructions embodying the various functionalities of the computing device 124.

In box 306, a sample 109 can be levitated. The sample 109 can be levitated using a feedback-controlled voltage applied to at least one of the electrodes 112. The feedback-controlled voltage can be determined based at least in part on a position of the sample 109 that is detected by a position sensor 115.

In box 309, the sample 109 can be melted into a liquid state using a heating laser once the sample 109 is levitated. In other examples, the sample 109 can be in a liquid state before being levitated.

In box 312, a signal is applied to at least one of the electrodes 112. The signal can include a fixed amplitude and can be swept over a range of frequencies that includes a predetermined frequency. The signal can be a sinusoidal signal, or another signal. The predetermined frequency can be a predicted resonance frequency determined using Rayleigh theory, or another value stored in the data store 136.

As the signal is swept, a camera 122 captures images of the sample 109. A respective one of the images is associated with a particular frequency that is applied to the sample when the respective one of the images is captured.

In box 315, an image is identified that shows a maximum disturbance of the sample. The maximum disturbance can be identified based at least in part on the respective image including a maximum distance across the sample, among the plurality of images. In some cases, the maximum distance can be measured across a major axis of a prolate shape of the sample shown in the respective image. In other cases, the maximum distance can be measured across an axis of an oblate shape of the sample shown in the respective image.

In box 318, the frequency of the signal that is applied when the image is captured can be identified. The frequency of the signal can be associated with a timestamp that identifies a particular time, or can be otherwise known to be applied at a particular time. Likewise, the image can be associated with another timestamp that identifies the same particular time, or can be otherwise known to be applied at the particular time. Accordingly, once the image that identifies the maximum disturbance of the sample 109 is known, the corresponding frequency can be determined or identified. This can be considered a measured resonance frequency of the sample 109.

In box 321, an IFT of the sample 109 can be determined using the measured resonance frequency. The IFT of the sample 109 is directly associated with the measured resonance frequency, so this can be considered a measured IFT of the sample 109.

The present disclosure presents 1) a benchmarking experimental method to measure surface tension by excitation of the second principal mode of oscillation (known as mode 3) in a levitated liquid droplet and 2) a more rigorous quantification of droplet excitation using a projection method. Surface tension measurements compare favorably to literature values for Zirconium, Inconel 625, and Rhodium, using both modes 2 and 3. Thus, this new method serves as a credible, self-consistent benchmarking technique for the measurement of surface tension.

1.1 Faraday Forcing

Introduced in the present disclosure is a refinement of the Faraday forcing method described in 2018 by Brosius et al [14] to include the mode n=3 in addition to a modified resonance quantification method. The Faraday forcing method was introduced as a method to stimulate resonance in electrostatically-levitated droplets using a frequency sweep, where the droplet is forced with an incrementally changing frequency in a range surrounding the predicted natural frequency. The droplet's deformation is recorded as it is forced. Resonance (increasing amplitude of droplet deformation) occurs as the forcing frequency approaches that of the droplet's natural frequency. In the earlier work, the magnitude of this deformation (i.e. the magnitude of resonance) was quantified by the normalized maximum diameter, defined as the maximum prolate diameter in resonance divided by the resting diameter of the droplet. This was due to the fact that only the first principal mode was sought, which corresponds to a prolate-oblate deformation. In FIG. 1, the quantitative representation of a frequency sweep, known as a resonance curve, was observed. The forcing frequency corresponding to the maximum of this curve is termed the resonant forcing frequency and is substituted into Equation 1 to solve for surface tension.

Figure 2:
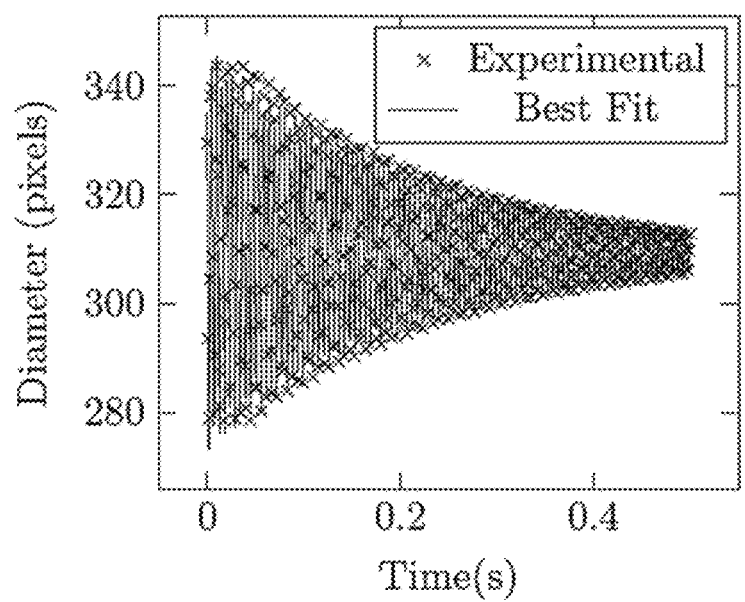
FIG. 2 shows a typical set of data from the pulse decay technique and its fit to an exponentially decaying sinuosoidal function, in accordance with various aspects of the present disclosure. Sample is 35.027 mg Zirconium at 1800° C.

The method stands in contrast to the so-called pulse-decay technique [5], where a droplet is forced to oscillate, and the forcing is abruptly stopped. The deformation of the droplet returning to rest is recorded as a function of time and fitted to an exponentially decaying sinusoidal function, as seen in FIG. 2. The frequency at which the oscillation decays approaches the fundamental frequency, corresponding to n=2, of the droplet. This pulse-decay technique has the advantage of being able to measure both surface tension and viscosity. However, the measurement of surface tension with the pulse-decay technique is faltered by the abrupt halt in forcing that is hypothesized to incur higher order modes of oscillation also induced by the feedback disturbances of the control system. This hypothesis was supported with data obtained with the Faraday forcing method reflecting consistently lower values for surface tension for Zirconium and TiZrNi (see Table 1) than were obtained using pulse-decay.

By expanding the Faraday forcing method to include the characterization of droplet resonance in mode 3, this method can serve as a self-consistent scheme for the measurement of surface tension. In employing this method, one performs a frequency sweep around the expected fundamental (n=2) mode frequency and records the result. The sample is then subsequently subject to a second frequency sweep around the expected n=3 frequency. The frequency at which n=3 is expected to resonate most strongly is also predicted by Equation 1. Resonance is quantified with the projection of the Legendre polynomials used to characterize the shape of the droplet's outline and provides a distinct modification to the method of Faraday forcing for the measurement of surface tension.

TABLE 1

Comparison of surface tension results using the Faraday forcing method from Brosius et al [14] and existing literature values using the pulse-decay technique.

| Sample | Temp. (° C.) | Measured surface tension (Nm$^{-1}$) | Literature surface tension (Nm$^{-1}$) | % Difference |
| --- | --- | --- | --- | --- |
| Zirconium | 1700 | 1.47715 ± 0.00783 | 1.51703 [15] | −3% |
| Zirconium | 1800 | 1.41230 ± 0.00764 | 1.50603 [15] | −6% |
| Ti$_{39.5}$Zr$_{39.5}$Ni$_{21}$ | 950 | 1.5320 ± 0.00965 | 1.670 [16] | −14% |

2 Methods

2.1 Experimental Methods

All experiments were conducted at the Electrostatic Levitation Facility (ESL) at NASA Marshall Space Flight Center (MSFC). The process of levitating the sample is identical to the methods outlined in Brosius et al [14]. Samples are levitated as a solid using an electrostatic position feedback system, which controls both vertical and horizontal positioning. The levitation chamber is first evacuated using a turbomolecular pump to 10$^{-7}$ torr. Electric charge is applied to the sample with a UV beam and replenished, if needed, throughout processing. The sample is heated and melted using a neodymium-doped yttrium aluminum garnet (Nd: YAG) laser, fiber optic laser, or CO$_2$ laser, depending on the sample material, and superheated approximately 50° C. above melting point and allowed to radiatively cool to solidification to record density measurements. A single wavelength pyrometer (for example, an Advanced Energy IMPAC IGA 140 or IS 140) is used to measure the temperature within the range 300 to 3500° C. In surface tension measurements, the sample is melted and then subcooled below the melting point (if possible) to minimize evaporation. Upon reaching the desired temperature, the heating laser is used to maintain constant temperature. A waveform generator and amplifier are connected to the upper electrode to allow the user to impose an oscillatory electric field. Droplet behavior is characterized with a high-speed camera at 5000 fps and 512 by 512 pixels, typically for durations of 1-1.5 s. The sample is massed both before and after processing to quantify evaporation.

The natural frequencies for both modes 2 and 3 are initially predicted using the droplet's mass and accepted literature surface tension value with equation 1. Modes 2 and 3 are both discovered using a method known as a frequency sweep, following the precise procedure of Brosius et al. For each frequency of a frequency sweep, an oscillatory voltage (known as a forcing frequency) is applied to the top/bottom electrodes for 1-2s. Upon completion of each forcing frequency, the oscillatory voltage is turned off and the droplet's deformations can come to rest before starting the next forcing frequency (typically 1s). The sweep is centered about the predicted natural frequency and, depending on confidence level, the step size (difference between one forcing frequency and the next) is 0.5-5 Hz, with 20-30 total frequencies tested. For example, the mode 2 natural frequency of a 35.027 mg Zirconium sample at 1800° C. is predicted to be 185 Hz, so the sweep would encompass frequencies ranging between 170-200 Hz, taking steps of 1 Hz. After finishing the mode 2 frequency sweep, the droplet remains levitated but is solidified to suppress evaporation. The videos from the high-speed camera are previewed after the sweep prior to download and resonance is characterized by eye before beginning the mode 3 sweep.

If there is no concrete literature value for the material of interest, multiple frequency sweeps are performed to find the resonance point of mode 2. First, a broad (100-200 Hz) sweep of large step size is used to force the droplet to resonate in mode 2. Subsequent sweeps follow with narrowing frequency range and decreasing step size until desired accuracy is achieved.

The fashion in which the mode 3 sweep is conducted depends on the preliminary results from the mode 2 sweep. If there is conclusive video evidence that the mode 2 sweep yielded strong resonance at a certain frequency (known as $f_{max}$), the mode 3 sweep will be centered on its corresponding mode 3 frequency. This corresponding mode 3 frequency, given by Equation 1, is $\sqrt{30/8}f_{max}$. The value of $f_{max}$ may be different than the predicted natural frequency from literature values. If there is not conclusive video evidence of resonance, the frequency sweep for mode 3 is chosen in accordance to accepted literature values, if they exist. If there are no existing literature values and no conclusive video of mode 2 is observed, mode 3 will be sought using a progressively narrowing set of frequency sweeps, identical to the fashion in which mode 2 is sought. The sample is remelted, subcooled (if possible), and the mode 3 frequency sweep is conducted, taking steps of 0.5-5 Hz.

All videos are processed and subsequently analyzed using ImageJ to obtain the droplet shadow area and outline as a function of time. Mathematica is used in the batch processing of the projection method and evaporation quantification. The forcing frequency which yields the highest magnitude of resonance for a given frequency sweep is termed the resonant frequency and plugged into Equation 1 to calculate surface tension.

2.2 Analysis Method

The method in which resonance is quantified is termed herein as the projection method, where Legendre polynomials corresponding to each mode's precise shape (as defined by Rayleigh [11] and often employed as a means of quantifying spherical deformations using image analysis [17]) are projected on to the outline of the droplet. While this method returns the same results for mode 2 as the method outlined in Brosius et al, it is more consistently used for both modes 2 and 3 and thus serves as a more robust quantification of resonance, which can be used for any axisymmetric deformation (see the Discussion for a detailed comparison of the projection method to the diameter method). In the absence of external forces and in the limit of low viscosity [18, 19, 20], deformations on a spherical surface can be described by [21]

$$r(\theta, \phi, t) = R_0 + \sum_{n=2}^{\infty} \sum_{m=-n}^{n} A_n^m e^{im\theta} P_n^m(\cos(\theta)) \cos(2\pi_n t) \quad (2)$$

where $R_0$ is the resting radius of the sphere, $A_m$ are deformation amplitudes, $P_m$ are the associated Legendre polynomials, n is a normal mode of oscillation, m represents degenerate modes of n, and $f_n$ is given by Equation 1.

Experimental findings by Rhim et al [5] noted that a single axisymmetric mode (m=0 in Equation 2) is preferentially excited compared to its non-axisymmetric counterparts (m=±1, ±2) when electrostatically levitated, meaning the droplet could be well-approximated by a simplified version of Equation 2

$$r(\theta, t) = R_0 + \sum_{n=2}^{\infty} A_n P_n(\cos(\theta)) \cos(2\pi f_n t) \quad (3)$$

where $P_n$ are the Legendre polynomials and $f_n$ remains the same. Charge effects unique to electrostatic levitation are derived by Rayleigh [22] and, in this work, amount to a negligible correction factor [23] to the natural frequency given by Equation 1.

Starting with an outline of the droplet, which is found through image analysis as a function $r(\theta, t)$, the function $\delta(\theta, t)$ is defined as the normalized difference between the outline and the resting radius of the droplet.

$$\delta r(\theta, t) = \frac{r(\theta, t)}{R_0} - 1 = \sum_{n=2}^{\infty} a_n P_n(\cos(\theta)) \cos(2\pi f_n t) \quad (4)$$

Note that $a_n$ are now normalized with respect to the resting droplet's radius, that is $a_n = A_n/R_0$. Since the Legendre polynomials obey the relationship:

$$\int_0^{2\pi} P_n(\cos(\theta)) P_m(\cos(\theta)) d\theta = \frac{2}{2n+1} \delta_{mn} \quad (5)$$

one may find the temporal amplitudes, $a_n(t)$, by way of projection, that is $$\alpha_n(t) = a_n \cos(2\pi f_n t) = \frac{2n+1}{n} \int_0^{2\pi} P_n(\cos(\theta)) \delta r(\theta, t) d\theta \quad (6)$$

Figure 3:
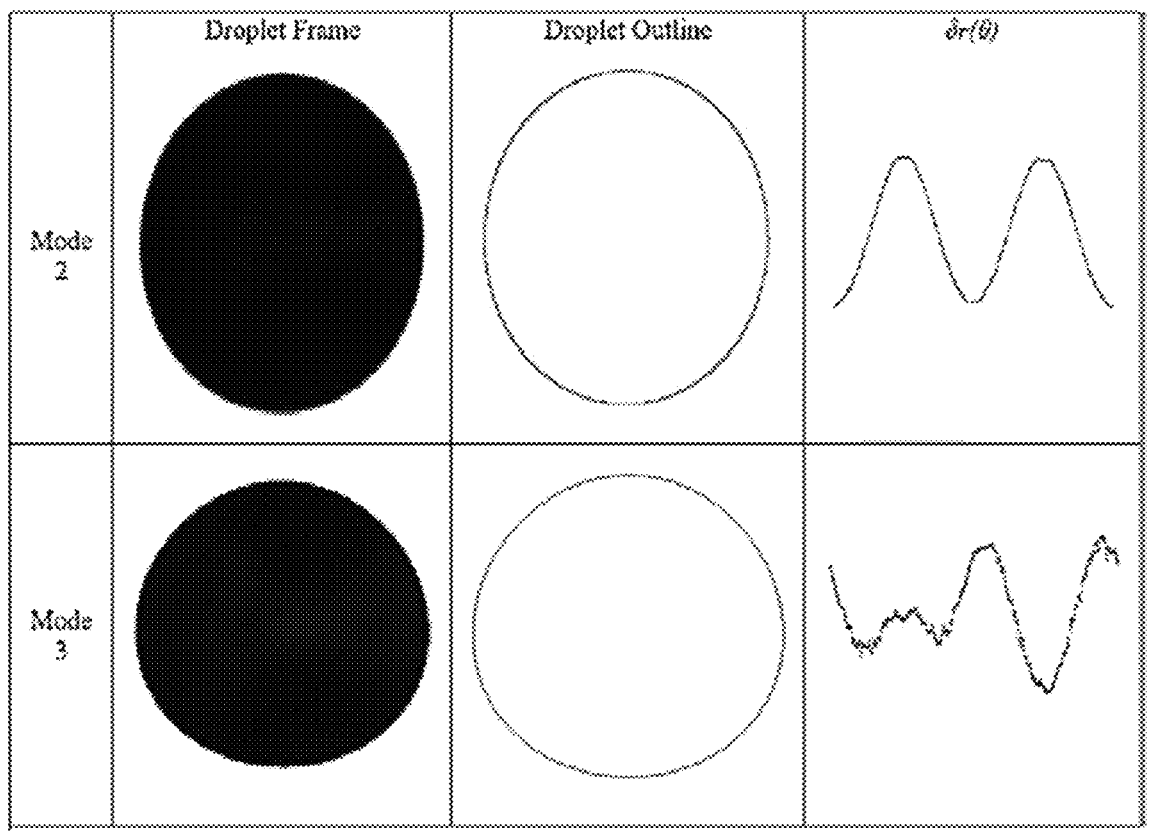
FIG. 3 shows a graphical illustration of the image analysis process for the projection method on mode 2 (top) and mode 3 (bottom), in accordance with various aspects of the present disclosure.
Figure 4:
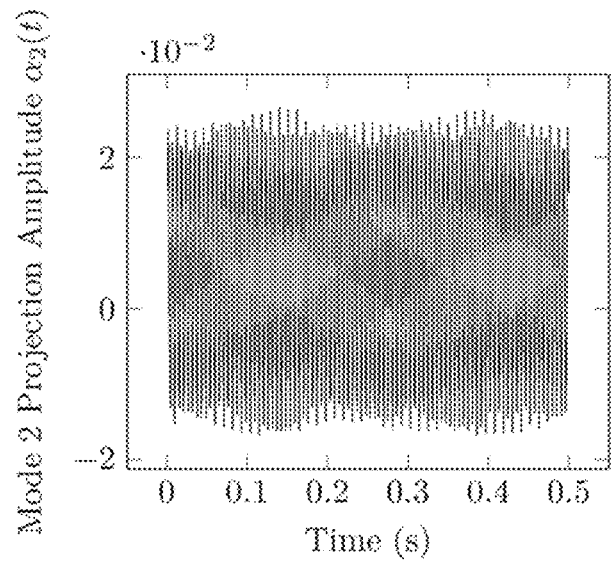
FIG. 4 shows time dependence of the projection amplitude $\alpha_2(t)$ on the prolate-oblate oscillation of mode 2 forced at 181 Hz, in accordance with various aspects of the present disclosure. Data obtained using a 35 mg droplet of Zirconium at 1800° C.

Using this definition of the projection amplitudes, one can therefore use the deformation outline $\delta r$ as obtained through image processing and perform a numerical integration scheme to quantify the amplitude of a given mode. The process is given graphically in FIG. 3. Performing this calculation for each frame of the video returns a graph like that shown in FIG. 4 for each forcing frequency.

Assuming sinusoidal behavior with total acquisition time T, one may assume the following relationship between the constant $a_n$ and the time-dependent data given by $\alpha_n(t)$ when the number of oscillation cycles is large:

$$a_n = \sqrt{2}\left(\frac{\int_0^T (\alpha_n(t))^2 dt}{\int_0^T dt}\right)^{\frac{1}{2}} = \sqrt{2}\left(\frac{1}{N}\sum_{i=1}^N a_{n,i}^2\right)^{\frac{1}{2}} \quad (7)$$

The resonant frequency for a given trial is taken to be the forcing frequency which resulted in the maximum resonance of the droplet in the prescribed modal shape (mode n=2 as shown in FIG. 5a or mode n=3 as shown in FIG. 5b).

3 Results and Discussion

Each frequency sweep, whether for mode 2 or mode 3, comprises a small, constant forcing amplitude and an incrementally changing forcing frequency which is superimposed over the control voltage of the upper and lower electrodes. Images are captured using a high-speed camera and analyzed to find the amplitude of the projection of each principal mode of oscillation as a function of time for each forcing frequency of the sweep. The difference in the magnitude of resonance can be qualitatively observed in both modes 2 and 3. The forcing frequency corresponding to the sample's maximum deviation is termed the resonant forcing frequency and is inserted into Equation 1 to solve for surface tension. Table 2 summarizes the measurements obtained during this work. The data from Brosius et al was also reanalyzed using the projection method, which is elaborated upon in the following sections. Surface tension measurement errors are determined by the ratio of the step size of the frequency sweep to the natural frequency and range from 1-4%.

TABLE 2

Table of results using the Faraday forcing method for modes 2 and 3. % difference corresponds to the difference between the measured surface tension value and the accepted literature value for modes 2 and 3 respectively.

| Material | Temp (° C.) | Literature ST (Nm$^{-1}$) | Mode 2 Trials | Mode 3 Trials | Mode 2 ST (Nm$^{-1}$) | Mode 2% difference | Mode 3 ST (Nm$^{-1}$) | Mode 3% difference |
|---|---|---|---|---|---|---|---|---|
| Zirconium | 1800 | 1.506 [24] | 14 | 12 | 1.38 ± 0.04 | −8% | 1.39 ± 0.021 | −8% |
| Inconel 625 | 1350 | 1.7 [25] ** | 11 | 4 | 1.72 ± 0.15 | 1% | 1.75 ± 0.041 | 3% |
| Rhodium | 1650 | 2.0291 [26] | 3 | 1 | 1.96 ± 0.01 | −4% | 1.96 ± 0.003 | −3% |

** There is no existing literature value to the authors' knowledge, so the value for Inconel 600 is used as a reasonable comparison.

3.1 Measurement of Surface Tension

The primary impact of this work is a proof-of-concept for a benchmarked measurement of surface tension using resonance of multiple modes of oscillation in levitated liquid materials. In the earlier work of Brosius et al [14], it was shown that the continuous Faraday forcing method yielded consistent results that agreed reasonably well with literature values (from the pulse-decay method). It was hypothesized in that work that the incorporation of higher-order modes that come from the pulse could cause a shift in natural frequency because of nonlinear interaction between modes. In Table 2, the values for mode 2 and mode 3 are remarkably consistent for samples of Zirconium, Rhodium, and Inconel 625, certifying the accuracy of the continuous forcing technique. The literature values for these three materials are also all within 10% of this report's measurements (note that literature values for Inconel 625 were unavailable and the value for Inconel 600 was used).

3.2 Comparisons with the Prior Quantification of Resonance

In the previous work, the magnitude of resonance was quantified in mode 2 by measuring the normalized maximum diameter of the droplet in resonance. This method, known as the diameter method, was straightforward because the droplet's shadow oscillates between an oblate and prolate ellipse in mode 2. An important update in the present disclosure is the modified approach to quantifying the resonance of the droplet using the projections of Legendre polynomials (stemming from a projection of the spherical harmonics). While the prior diameter-based method was more straightforward, it did not lend the generality that the projection method provides—that is, the current method can quantify any modal deformation (provided the droplet is adequately spherical when unforced and perturbations are axisymmetric). As might be expected, the two methods do agree in the characterization for mode 2 resonance, shown in FIG. 6.

3.3 Comparisons with Indirect Methods of Resonance Quantification

Figure 7:
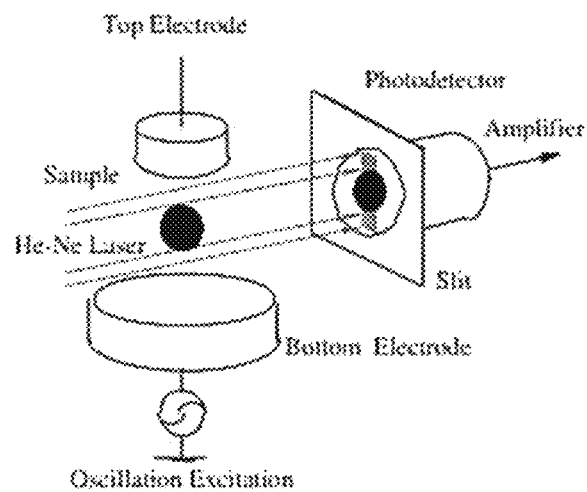
FIG. 7 shows area array setup at JAXA used to characterize the behavior of the oscillating droplet (Borrowed from [27] with permission from Elsevier, Inc.), in accordance with various aspects of the present disclosure.

The magnitude of resonance may also be characterized using indirect (non-image-based) methods. For example, the electrostatic levitator at the Japan Aerospace and Exploration Agency (JAXA) in Tsukuba, Japan uses a He—Ne laser to cast a shadow on a photodetector, which is blocked by the sample, as shown in FIG. 7. This setup is known as an area array and is also used to characterize droplet behavior on the Electrostatic Levitation Furnace (ELF) on the International Space Station, also operated by JAXA. The output signal from the receiver is directly proportional to the shadow area and provides a distinct advantage in computation time when compared to imaging-based methods. The strength of oscillations in the droplet's area are proportional to the magnitude in which the droplet is oscillating in mode 2. The definition below is used to quantify the droplet shadow's area deviation given time-dependent data.

$$A_{meansq} = \frac{1}{N} \sum_{i=1}^{N} \left( \frac{A_i - A_{avg}}{A_{avg}} \right)^2 \qquad (8)$$

where $A_{avg}$ is the time-averaged shadow area of all instantaneous shadow area values $A_i$.

Figure 8:
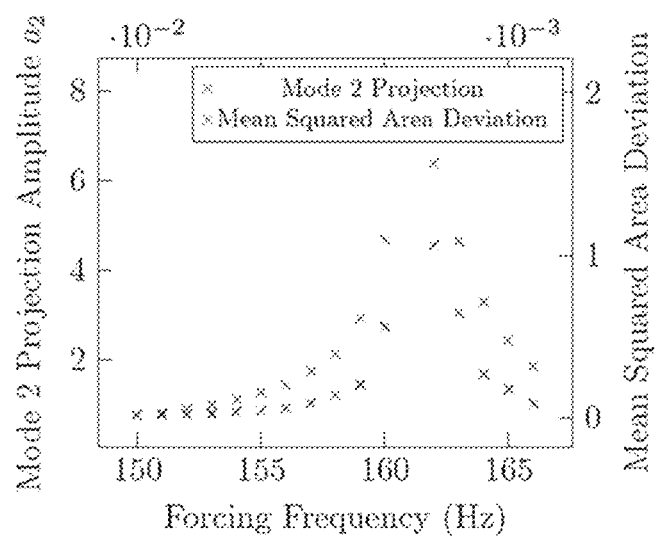
FIG. 8 shows comparison of results from an area array and projection method for mode 2 resonance. Sample is 57.345 mg Inconel 625 at 1350° C., in accordance with various aspects of the present disclosure.

In FIG. 8, area data is artificially created using the video data obtained at NASA MSFC's ESL facility and compared to the results obtained using projections in mode 2. One observes that the forcing frequency resulting in the maximum projection amplitude coincides with the forcing frequency obtained in quantifying the droplet's oscillation using the shadow area.

While indirect area arrays may be used to effectively quantify the droplet's deformation in mode 2, the method is unsuccessful in quantifying resonance of mode 3. The reasoning for this discrepancy lies in the fact that the area of the shadow is negligibly affected by deformation in mode 3. This is proven using an approach akin to that of the application of the Rayleigh work principle in liquid bridge stability [28]. The shadow area A of the deformed droplet is given by the following integral:

$$A = \int_0^{2\pi} \frac{(R + \delta r(\theta))^2}{2} d\theta \qquad (9)$$

where $\delta r(\theta)$ is the droplet shadow's deviation from a circle and R is not the physical resting radius $R_0$ but rather a characteristic radius defined such that the volume V is constant, that is:

$$V = \frac{4}{3}\pi R_0^3 = 2\pi \int_0^{\pi} \frac{(R + \delta r(\theta))^3}{3} \sin(\theta) d\theta \qquad (10)$$

The mode 2 and mode 3 disturbances are given by the Legendre polynomials for n=2 and n=3, respectively. That is, $$\delta r(\theta) = \sum_{n=2}^{3} a_n P_n(\cos(\theta)) \qquad (11)$$

$$P_2(\cos(\theta)) = \frac{1}{2}(-1 + 3\cos^2(\theta)) \qquad (12)$$

$$P_3(\cos(\theta)) = \frac{1}{2}(-3\cos(\theta) + 5\cos^3(\theta)) \qquad (13)$$

Figure 9:
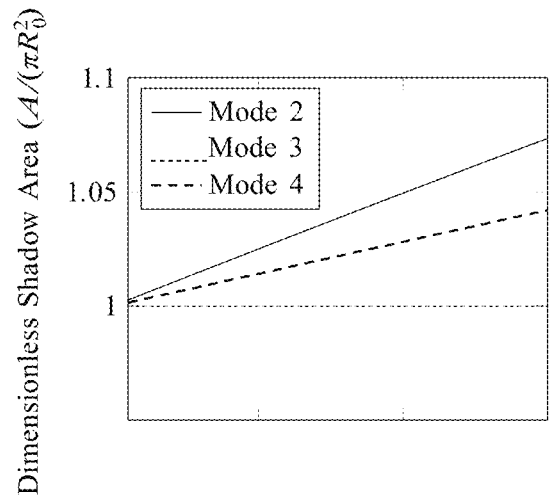
FIG. 9 shows relationship between the dimensionless shadow area $(A/(\pi R^2))$ and amplitude $a_n$ observed in an analytical form of the droplet with superimposed mode 2, mode 3, and mode 4 functions, with volume constrained to $4/3\pi R_0^3$, in accordance with various aspects of the present disclosure.

The area of the droplet's shadow may then be found analytically as a function of the amplitude $a_n$ of each normal mode. Shown in FIG. 9 is the relationship between the shadow area (normalized with respect to the resting area, $\pi R^2$) and the amplitude, $a_n$. This indicates that, although the droplet may be oscillating strongly, a signal reflecting the area of the droplet's shadow is insufficient in characterizing the resonance of mode 3. However, the mode n=4 is included to illustrate that this area array setup can still be used in conjunction with the continuous Faraday forcing method with higher harmonics, provided that n is even.

Figure 10:
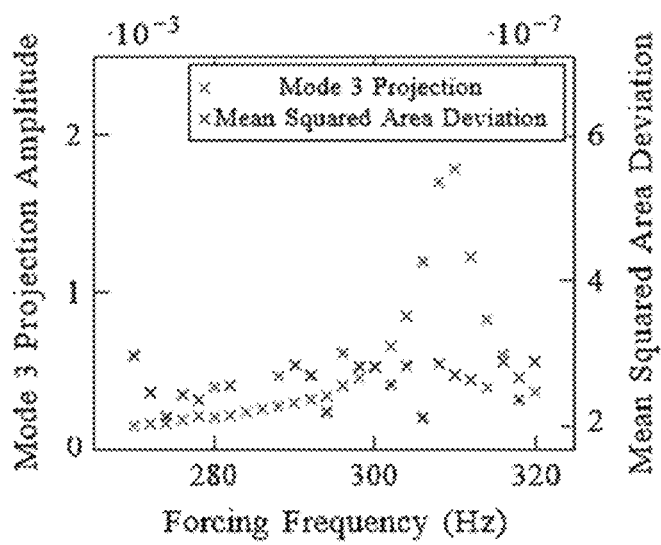
FIG. 10 shows comparison of results from an area array and projection method for mode 2 resonance. Sample is 57.345 mg Inconel 625 at 1350° C., in accordance with various aspects of the present disclosure.

This conclusion is further confirmed in analyzing experimental data where mode 3 was definitively observed, by attempting to quantify resonance using an artificial area array. Shown in FIG. 10 is a mode 3 frequency sweep using Inconel 625 where the projection method yields a strong resonance curve with a clear resonant frequency, while the mean squared area deviation does not yield any conclusive result.

3.4 Experimental Challenges

There are several challenges that encompass the practice of this method which either directly or indirectly stem from the presence of gravity. The levitation process on Earth can only successfully levitate samples which have suitable thermophysical properties. For example, very dense materials like Platinum or Iridium are difficult to levitate because of high density and high melting point. The charge of the droplet, needed for levitation control, changes as the sample is heated due to thermionic emission. In some cases, this can cause dramatic changes in surface charge and result in the loss of the sample. Materials that cannot be subcooled sufficiently below melting point (or otherwise have high vapor pressures) present an additional challenge with constant evaporation. This evaporation limits processing time and can cause potential fouling of the sensitive equipment within the chamber. Evaporation can be limited by levitating samples within a pressurized atmosphere, but this is challenging on Earth because the strength of electric field required for levitation is beyond the threshold for electrical breakdown and results in arcing. There are also challenges that result in the nonlinear dynamics of the spherical droplet being subject to an oscillatory forcing. As described in Methods, the droplet is assumed to be co-symmetric. However, this is an assumption that is based on experimental observation and is not strictly obeyed. The degenerate modes (say m=−2, −1, 0, 1, 2 for n=2) all ordinarily coexist at the same frequency and all have some probability of being excited. However, in this experiment, the m=0 mode is most often observed. When one of the degenerate modes are excited, this causes an "off-axis" oscillation and torque from the electric field can cause substantial spinning of the droplet. This spinning, as seen in the attached video, splits the degenerate modes into three frequencies. Spinning can also be stimulated without deformation of the droplet due to photon pressure of the heating laser. These dynamics can be minimized by lowering the amplitude of forcing and allowing the droplet to fully relax in between forcing frequencies. To accommodate these challenges, the frequency sweeps garnering highly nonlinear coupling behavior are analyzed but not used in the measurement of surface tension because of the shifting of the natural frequencies.

3 Conclusions

This work confirms that the principle behind using a series of frequency sweeps to identify multiple modes of oscillation in levitated liquid droplets can serve as a self-consistent, benchmarking method for the measurement of surface tension. Three materials—Zirconium, Rhodium, and Inconel 625—have exhibited consistent, predictable behavior in the resonance of the first two principal modes of oscillation which serves to confirm the surface tension measurement in a fashion superior to repetition alone.

Visualization methods affect the ability to observe odd harmonics of oscillation, as shown in FIG. 10, if using an indirect visualization setup like an area array. However, as indicated in FIG. 9, higher harmonics corresponding to even values of n may be sensible in future experiments using area arrays. The difficulty in experimentally attaining higher harmonics lies in the higher energy states and correspondingly high damping rates, which are limited by the forcing voltage and the charge of the droplet. This difficulty may be alleviated by operating on samples in low gravity with low fundamental frequencies given by Equation 1 (i.e. low surface tension and large mass).

The method of Faraday forcing for the measurement of surface tension could be extended to resonance of higher order modes and an expanded array of materials such as glasses, oxides, and alloys. Levitation experiments on the International Space Station which use an area array for sample monitoring can be effectively utilized in observing further benchmarking of the method using even harmonics. Space experiments can also be used to measure the surface tension of materials of high density such as Gold and Platinum which are difficult to electrostatically levitate on Earth.

It should be emphasized that the above-described aspects of the present disclosure are merely possible examples of implementations and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The following references are incorporated herein in their entirety:

[1] Brillo, J. *Thermophysical properties of multicomponent liquid alloys* (Walter de Gruyter GmbH & Co KG, 2016).

[2] Prater, T., Werkheiser, N. & Ledbetter, F. Toward a multimaterial fabrication laboratory: In-space manufacturing as an enabling technology for long-endurance human space flight (2018).

[3] Mani, M. et al. Measurement science needs for real-time control of additive manufacturing powder bed fusion processes (2015).

[4] Langer, J. S. Instabilities and pattern formation in crystal growth. *Reviews of modern physics* 52, 1 (1980).

[5] Rhim, W.-K., Ohsaka, K., Paradis, P.-F. & Spjut, R. E. Noncontact technique for measuring surface tension and viscosity of molten materials using high temperature electrostatic levitation. *Review of scientific instruments* 70, 2796-2801 (1999).

[6] Winborne, D. A., Nordine, P. C., Rosner, D. E. & Marley, N. F. Aerodynamic levitation technique for containerless high temperature studies on liquid and solid samples. *Metallurgical Transactions B* 7, 711-713 (1976).

[7] Kremer, J., Kilzer, A. & Petermann, M. Simultaneous measurement of surface tension and viscosity using freely decaying oscillations of acoustically levitated droplets. *Review of Scientific Instruments* 89, 015109 (2018).

[8] Trinh, E., Zwern, A. & Wang, T. An experimental study of small-amplitude drop oscillations in immiscible liquid systems. *Journal of Fluid Mechanics* 115, 453-474 (1982).

[9] Lohofer, G. & Piller, J. The new iss electromagnetic levitation facility-'msl-eml'. In *40th AIAA Aerospace Sciences Meeting & Exhibit,* 764 (2002).

[10] Rogers, J., Robinson, M., Savage, L., Soellner, W. & Huie, D. An overview of the msfc electrostatic levitation facility (1999).

[11] Rayleigh, L. On the capillary phenomena of jets. *Proc. R. Soc. London* 29, 71-97 (1879).

[12] Trinh, E. Compact acoustic levitation device for studies in fluid dynamics and material science in the laboratory and microgravity. *Review of scientific instruments* 56, 2059-2065 (1985).

[13] Fraser, M. E., Lu, W., Hamielec, A. & Murarka, R. Surface tension measurements on pure liquid iron and nickel by an oscillating drop technique. *Metallurgical Transactions* 2, 817-823 (1971).

[14] Brosius, N., Ward, K., Matsumoto, S., SanSoucie, M. & Narayanan, R. Faraday forcing of high-temperature levitated liquid metal drops for the measurement of surface tension. *npj Microgravity* 4, 1-5 (2018).

[15] Hyers, R. et al. Surface tension and viscosity of quasicrystal-forming ti-zr-ni alloys. *International journal of thermophysics* 25, 1155-1162 (2004).

[16] Bradshaw, R. et al. Nonlinearities in the undercooled properties of ti39. 5zr39. 5ni21. *Philosophical Magazine* 86, 341-347 (2006).

[17] Egry, I. Surface tension measurements of liquid metals by the oscillating drop technique. *Journal of materials science* 26, 2997-3003 (1991).

[18] Prosperetti, A. Free oscillations of drops and bubbles: the initial-value problem. *Journal of Fluid Mechanics* 100, 333-347 (1980).

[19] Miller, C. & Scriven, L. The oscillations of a fluid droplet immersed in another fluid. *Journal of fluid mechanics* 32, 417-435 (1968).

[20] Lamb, H. On the oscillations of a viscous spheroid. *Proceedings of the London Mathematical Society* 1, 51-70 (1881).
[21] Abramowitz, M. & Stegun, I. A. *Handbook of mathematical functions with formulas, graphs, and mathematical tables*, vol. 55 (US Government printing office, 1948).
[22] Rayleigh, L. Xx. on the equilibrium of liquid conducting masses charged with electricity. *The London, Edinburgh, and Dublin Philosophical Magazine and Journal of Science* 14, 184-186 (1882).
[23] Feng, J. & Beard, K. Small-amplitude oscillations of electrostatically levitated drops. *Proceedings of the Royal Society of London. Series A: Mathematical and Physical Sciences* 430, 133-150 (1990).
[24] Paradis, P.-F., Ishikawa, T. & Yoda, S. Non-contact measurements of surface tension and viscosity of niobium, zirconium, and titanium using an electrostatic levitation furnace. *International journal of thermophysics* 23, 825-842 (2002).
[25] Vinet, B., Garandet, J.-P., Marie, B., Domergue, L. & Drevet, B. Surface tension measurements on industrial alloys by the drop-weight method. *International journal of thermophysics* 25, 869-883 (2004).
[26] Paradis, P.-F., Ishikawa, T. & Yoda, S. Thermophysical property measurements of supercooled and liquid rhodium. *International journal of thermophysics* 24, 1121-1136 (2003).
[27] Paradis, P.-F., Ishikawa, T. & Koike, N. Non-contact measurements of the surface tension and viscosity of molybdenum using an electrostatic levitation furnace. *International Journal of Refractory Metals and Hard Materials* 25, 95-100 (2007).
[28] Johns, L. E. & Narayanan, R. *Interfacial instability* (Springer Science & Business Media, 2007).

Therefore, at least the following is claimed:

1. A method for measuring surface tension of a levitated sample, comprising:
    levitating a sample using electrostatic levitation;
    applying a signal to at least one electrode, wherein the signal excites the sample into a n=3 mode of oscillation, where the signal is swept over a range of frequencies during which the n=3 mode of oscillation is excited and that includes a predetermined frequency;
    capturing a plurality of images of the sample using a camera device, a respective image of the plurality of images being associated with a particular frequency that is applied to the sample when the respective image is captured;
    quantifying, using at least one computing device, a plurality of sample resonance using a projection method of Legendre polynomials based on the plurality of images, a respective sample resonance being associated with a respective image and a particular frequency that is applied to the sample when the respective image is captured; and
    determining, using the at least one computing device, a measured resonance frequency of the sample by an analysis of the plurality of sample resonance that indicates that the respective sample resonance shows a maximum response deviation of the levitated sample, wherein the measured resonance frequency is the particular frequency that is associated with the respective sample resonance.

2. The method of claim 1, further comprising determining a surface tension of the sample based on the measured resonance frequency of the sample at n=3 mode of oscillation.

3. The method of claim 1, further comprising:
    determining a measured resonance frequency of the sample at n=2 mode of oscillation; and
    determining a surface tension of the sample at least partly based on the measured resonance frequency of the sample at n=2 mode of oscillation.

4. The method of claim 1, further comprising:
    determining a measured resonance frequency of the sample at n=4 mode of oscillation; and
    determining a surface tension of the sample at least in part based on the measured resonance frequency of the sample at n=4 mode of oscillation.

5. The method of claim 1, wherein the predetermined frequency is a predicted resonance frequency determined using a formula that relates frequency to spherical radius, density, and surface tension of the sample.

6. The method of claim 1, wherein the signal is a sinusoidal signal.

7. The method of claim 1, further comprising melting the sample into a liquid state using a heating laser once the sample is levitated.

8. The method of claim 7, wherein the sample is maintained at a substantially constant temperature by the heating laser based upon a monitored temperature of the sample.

9. A system for measuring surface tension of a levitated sample, comprising:
    a plurality of electrodes;
    a position sensor;
    a camera device; and
    at least one computing device that executes instructions that cause the system to at least:
        levitate a sample using a feedback-controlled voltage applied to at least one of the plurality of electrodes, wherein the feedback-controlled voltage is determined based at least in part on a position of the sample that is detected by the position sensor;
        apply a signal to at least one of the plurality of electrodes, wherein the signal comprises a fixed amplitude exciting the sample into a n=3 mode of oscillation and is swept over a range of frequencies during which the n=3 mode of oscillation is excited and that includes a predetermined frequency;
        capture a plurality of images of the sample using the camera device, a respective image of the plurality of images being associated with a particular frequency that is applied to the sample when the respective image is captured;
        quantify a plurality of sample resonance using a projection method of Legendre polynomials based on the plurality of images, a respective sample resonance being associated with a respective image and a particular frequency that is applied to the sample when the respective image is captured; and
        determine a measured resonance frequency of the sample by an analysis of the plurality of sample resonance that indicates that the respective sample resonance shows a maximum response deviation of the levitated sample, wherein the measured resonance frequency is the particular frequency that is associated with the respective sample resonance.

10. The system of claim 9, wherein the at least one computing device further executes instructions that cause the at least one computing device to determine a surface tension of the sample using the measured resonance frequency at n=3 mode of oscillation.

11. The system of claim 9, wherein the at least one computing device further executes instructions that cause the at least one computing device to:
- determine a measured resonance frequency of the sample at n=2 mode of oscillation; and
- determine a surface tension of the sample at least partly based on the measured resonance frequency of the sample at n=2 mode of oscillation.

12. The system of claim 9, wherein the at least one computing device further executes instructions that cause the at least one computing device to:
- determine a measured resonance frequency of the sample at n=4 mode of oscillation; and
- determine a surface tension of the sample at least in part based on the measured resonance frequency of the sample at n=4 mode of oscillation.

13. The system of claim 9, wherein the predetermined frequency is a predicted resonance frequency determined using a formula that relates frequency to spherical radius, density, and surface tension of the sample.

14. The system of claim 9, wherein the signal is a sinusoidal signal.

15. The system of claim 9, further comprising a heating laser that melts the sample into a liquid state using a heating laser once the sample is levitated.

16. The system of claim 15, wherein operation of the heating laser is controlled to maintain the sample at a substantially constant temperature.

17. The system of claim 16, comprising a temperature sensor configured to monitor temperature of the levitated sample.

18. The system of claim 9, further comprising an ultraviolet lamp positioned to impart a charge on the sample.

* * * * *